April 19, 1932. C. C. RICHARD 1,854,957
WELDING MACHINE
Filed June 13, 1930 2 Sheets-Sheet 1

INVENTOR
CLEMENT C. RICHARD
BY
ATTORNEY

April 19, 1932.  C. C. RICHARD  1,854,957
WELDING MACHINE
Filed June 13, 1930   2 Sheets-Sheet 2
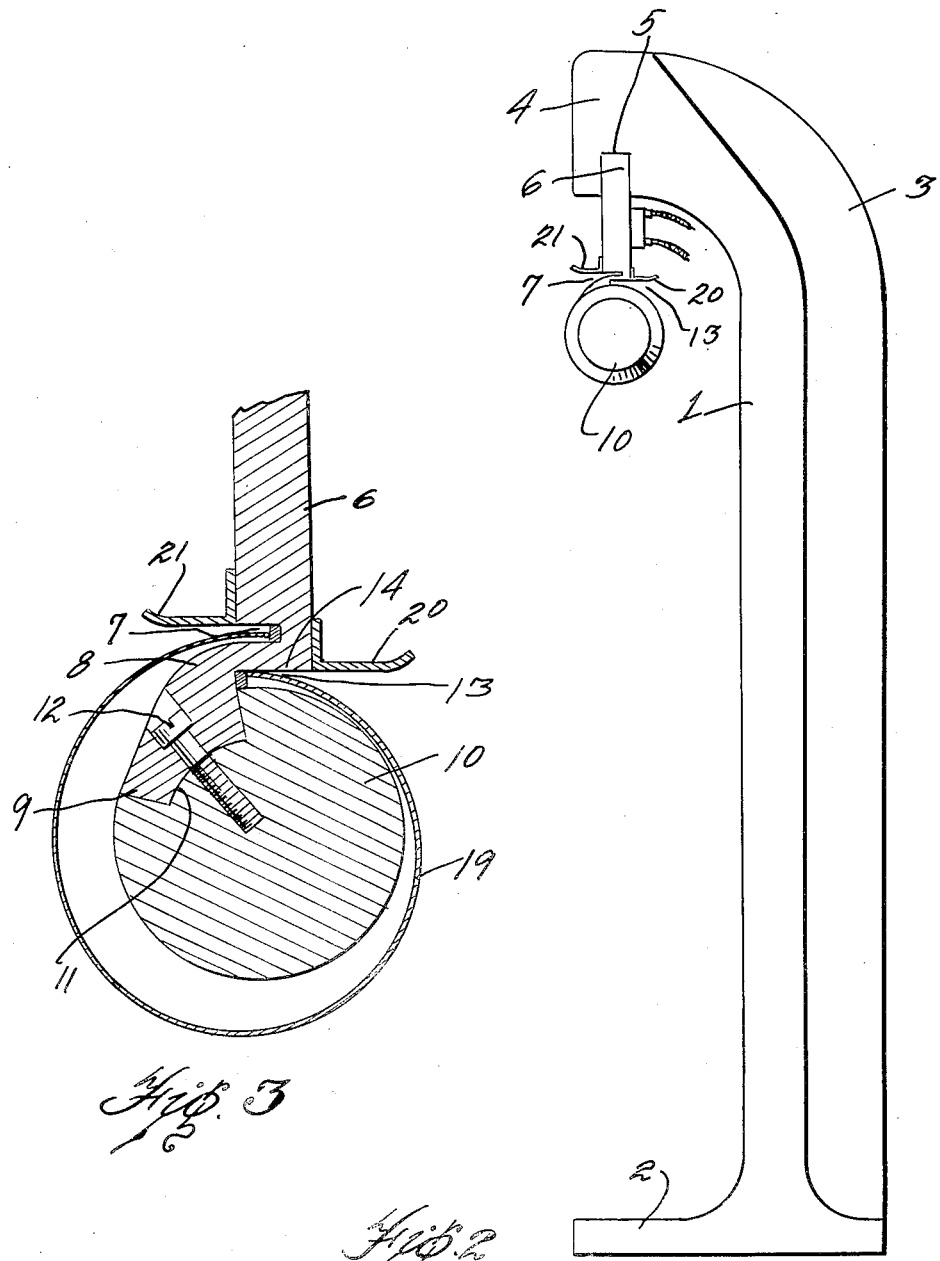
INVENTOR
CLEMENT C. RICHARD
BY
ATTORNEY Patented Apr. 19, 1932

1,854,957

UNITED STATES PATENT OFFICE

CLEMENT C. RICHARD, OF DETROIT, MICHIGAN, ASSIGNOR TO ALLIED PRODUCTS CORPORATION, OF DETROIT, MICHIGAN, A CORPORATION OF ILLINOIS

WELDING MACHINE

Application filed June 13, 1930. Serial No. 460,986.

This invention relates to seam welding machines and the object of the invention is to provide a welding machine particularly adapted for producing tubes in continuous lengths from the metal sheets or strips.

Another object of the invention is to provide an arrangement whereby a metal sheet may be rolled to convolute form to bring the edges in spaced relation one above the other and as the edges pass into the welder they are brought together into over-lapped relation and welded while in this relation.

Another object of the invention is to provide a mandrel along which the sheet may be fed in convolute form and so arranged as to maintain the edges of the sheet spaced apart in over-lapping relation until fed into the welding rollers.

A further object of the invention is to provide a longitudinal support channeled to receive the edges of a metal sheet when rolled to convolute form and arranged so that the over-lapping edges of the sheet may be fed into a lap welder as the sheet passes from the supporting member.

Another object of the invention is to provide a mandrel carrying a welding roller over which the lapped edges of the sheet may be fed, a second welding roller being provided riding on the outer surface of the lapped edges and adapted to form a lamp weld as the lapped seam passes therebeneath.

These objects and the several novel features of the invention are hereinafter more fully described and claimed and the preferred form of construction by which these objects are attained is shown in the accompanying drawings in which—

Fig. 2 is an end view of the machine taken from the right end of Fig. 1.

Fig. 3 is an enlarged section taken on line 3—3 of Fig. 1.

Figure 1:
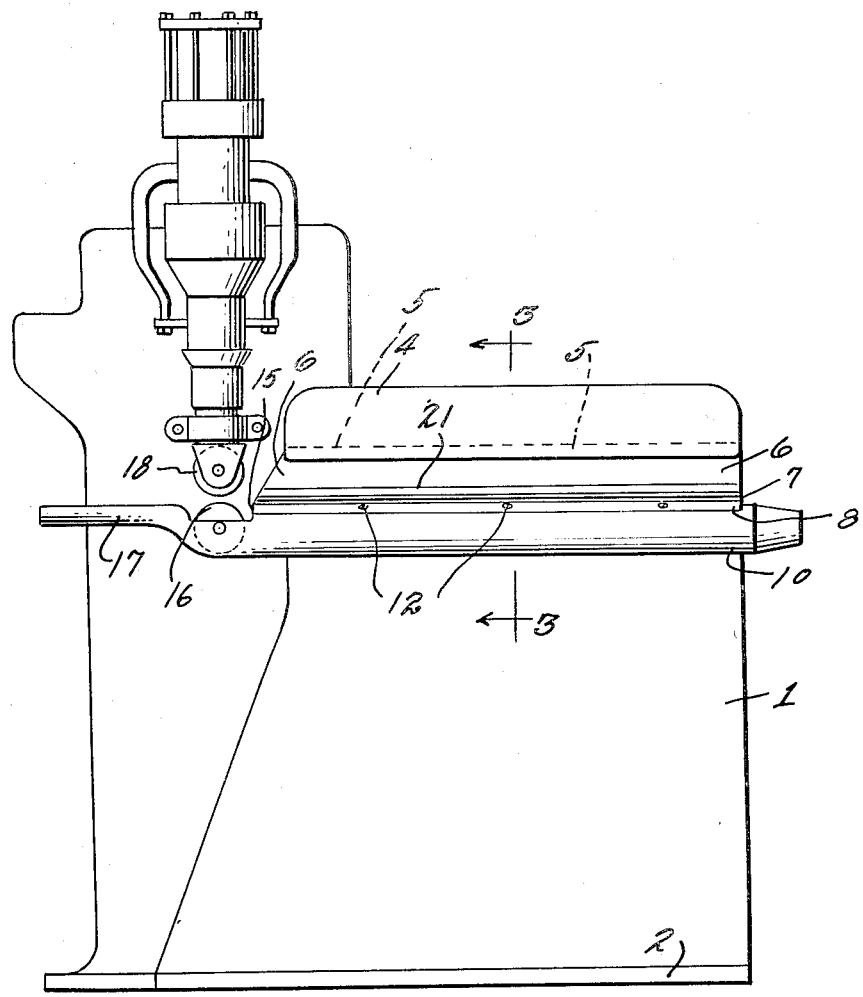
Fig. 1 is a front elevation of a continuous seam welding machine embodying my invention.

As shown in Figs. 1 and 2 the device comprises a metal base member 1 having a foot 2 extending longitudinally thereof and provided with strengthening ribs 3 on the rear side. The member 1 is provided with an inturned flange 4 at the upper end which extends longitudinally thereof. This flange 4 is provided with a channel 5 on the under side and a metal supporting member 6 extends longitudinally of the channel 5 and is secured therein by any suitable means. The supporting member 6 is shown more in detail in Fig. 3 and is provided with a horizontal slot 7 extending longitudinally thereof and the member 6 is provided with a portion 8 extending downwardly on a curve from the slot 7 and providing a segmental portion 9 to which the mandrel 10 may be secured.

The mandrel 10 comprises a cylindrical bar extending longitudinally of the base 1 and having a channel 11 cut therein to receive the portion 9 of the supporting member 6. This portion 9 may be secured in the mandrel 10 in any desired manner such as by machine screws 12 connecting the two members at intervals throughout their length. With the mandrel 10 secured to the member 9, as shown, a channel 13 is formed between the end 14 of the supporting member 6 and the adjacent surface of the mandrel 10. By this arrangement the channel 13 is positioned directly beneath the channel 7 and these two channels extend in spaced relation throughout the length of the supporting member 6. As shown in Fig. 1 these channels terminate at the end 15 of the supporting member 6 and a welding roller 16 is rotatably mounted in the mandrel adjacent the ends of the channels 7 and 13. The mandrel is also provided with a portion 17 extending beyond the roller 16 which forms a guide for the tubing after passing through the welding rollers.

The welding machine with which this device is to be used may be of any standard make and the particular form of welding machine is unimportant except that it have a welding roller, such as the roller 18, operating in electrical circuit with the welding roller 16. In welding machines of this type, the machine is usually adjustable to move the roller 18 toward or away from the stationary roller 16 in order to make a proper contact for a lap weld.

In operation a strip of sheet metal of desired length is rolled or positioned by hand in convolute form as shown at 19 in Fig. 3. One edge of the sheet is fed into the channel 7 while the other edge is fed into the channel 13 and shoes 20 and 21 are secured to the sides of the member 6 in alignment with the upper edges of the channels 13 and 7 respectively to aid in feeding the edges of the convolute sheet into the respective channels and to prevent the edges of the sheet from coming out of the channels. It will be noted that when positioned in the channels 7 and 13 the edges of the metal sheet are in over-lapping spaced relation and the sheet is fed lengthwise of the member 6 in this form until it passes out of the ends of these channels at the point 15. At this time, these overlapping edges of the sheet are fed between the rollers 18 and 16 which press the edges of the sheet together and hold them together during the welding operation, the portion 17 of the mandrel acting as a guide to maintain the tube in proper alignment with the welding rollers. By means of this device, tubing of any length may be produced depending on the length of the metal sheet or strip it is possible to obtain.

While I have described the device for use with electric welding machines, it may be used with any type of welder capable of forming a lap weld.

From the foregoing description it becomes evident that the device is very simple and efficient in operation, will produce welded tubing continuously in any desired lengths, may be easily operated and provides a device which accomplishes the objects described.

Having thus fully described my invention, its utility and mode of operation, what I claim and desire to secure by Letters Patent of the United States is—

1. In a continuous seam welding machine, a base, a depending supporting member secured to and extending longitudinally of said base, a mandrel secured to the lower edge of the supporting member, the supporting member being formed to provide a pair of channels opening on opposite sides thereof and extending longitudinally of the supporting member in spaced relation one above the other, said channels being adapted to receive and support the edges of a metal sheet rooled to convolute form in spaced overlapping relation, the edges of the metal sheet passing from the channels in spaced over-lapped relation, a welding roller supported in the mandrel adjacent the ends of the channels, the said mandrel having a portion extending beyond the discharge side of the roller, the lower edge of the metal sheet being adapted to ride on the said welding roller, a second welding roller supported above the first welding roller and adapted to contact the upper edge of the metal sheet, the said welding rollers being arranged to press the over-lapping edges of the sheet together and means for passing a welding current through the welding rollers.

2. In a continuous seam welding machine, a base, a depending supporting member secured to and extending longitudinally of said base, a mandrel secured to the lower edge of the supporting member, the supporting member being formed to provide a pair of channels opening on opposite sides thereof and extending longitudinally of the supporting member in spaced relation one above the other and adapted to receive and support the edges of a metal sheet rolled to convolute form in spaced overlapping relation, the edges of the metal sheet passing from the channels in spaced over-lapped relation, a pair of welding rollers adapted to bring the overlapped edges of the metal sheet to contact, means for welding the edges together as they are brought to contact, and means for supporting the welded article as it passes from the welding rollers.

3. In a continuous seam welding machine, a base, a depending supporting member secured to and extending longitudinally of said base, a cylindrical mandrel secured to the lower edge of the supporting member and forming in combination with the supporting member a longitudinal channel opening on one side of the supporting member, the supporting member being provided with a longitudinal channel opening on the opposite side thereof from the aforementioned channel and positioned thereabove, the channels being adapted to receive the edges of a metal sheet rolled to convolute form, means for bringing the edges of the convolute sheet to contact as they pass from the channels and means for continuously welding the edges of the metal sheet together as they are brought to contact, a mandrel having a portion extending beyond the said means for bringing the edges of the sheet to contact and providing a support for the welded article.

4. In a continuous seam welding machine. a base having a horizontally extending upper edge, a depending supporting member secured in and extending longitudinally of said horizontal edge, a mandrel secured to and supported by the supporting member, the supporting member and mandrel being formed to provide spaced channels extending longitudinally thereof in over-lapping relation and arranged to receive the edges of a metal sheet rolled to convolute form, a shoe extending outwardly from each of the said channels on opposite sides of the supporting member providing extensions overlying the inturned edges of the sheet to support the same in place, means for pressing the overlapping edges of the metal sheet together as they pass from the channels and means for welding said over-lapping edges together while held in contact.

5. In a continuous seam welding machine, a vertical base member having a horizontally extending upper edge, a depending supporting member secured in and extending longitudinally of said horizontal edge, a mandrel supported thereby, the supporting member being formed to provide spaced channels in over-lapping relation and arranged to receive the edges of a metal sheet rolled to convolute form, a pair of welding rollers adjacent the ends of the channels adapted to bring the over-lapping edges into contact, said mandrel being formed to support one of the said rollers at a distance from the discharge end and means for welding the over-lapping edges of the sheet together while held in contact, the portion of the mandrel extending beyond the roller supported thereby providing a support for the welded tube as it passes from the welding rollers.

6. In a continuous seam welding machine, a base, a depending supporting member secured to and extending longitudinally of said base and formed to provide a pair of channels extending longitudinally thereof one above the other and opening on opposite sides of the supporting member, the said channels being arranged to receive the edges of a metal sheet rolled to convolute form, a horizontally extending shoe at the upper edge of the edge of the channels and providing a means for retaining the edges of the sheet in place, means for bringing the edges of the sheet to contact as they pass from the channels and means for welding the edges together while held in contact.

7. In a machine for forming a continuous weld, a vertical base member having the terminal horizontally extending upper end at one end, a mandrel supported thereby formed with horizontal overlapping channel like portions at opposite edges to receive the opposed edges to be welded, said mandrel having a portion extending beyond the channel portion thereof, a roller supported in said portion at the end of the channels, a second roller positioned thereabove, and means for supplying electric current to the rollers whereby the edges are welded together as they pass from the channel, the portion of the mandrel supporting the said roller extending beyond the discharge side thereof and having an upper face practically in horizontal alignment with the upper part of the roller surface providing a support for the welded article as it passes from the rollers.

In testimony whereof I sign this specification.

CLEMENT C. RICHARD.